Oct. 13, 1959 W. W. ALEXANDER ET AL 2,908,246

LUBRICANT DISPENSER FOR LUBRICATING STRIP MATERIAL

Filed July 15, 1957

INVENTORS
WILLIAM W. ALEXANDER
RUSSELL M. MAGEE

BY John Gibson Semmes
ATTORNEY

United States Patent Office 2,908,246
Patented Oct. 13, 1959

2,908,246

LUBRICANT DISPENSER FOR LUBRICATING STRIP MATERIAL

William W. Alexander and Russell M. Magee, Atlanta, Ga.

Application July 15, 1957, Serial No. 671,977
4 Claims. (Cl. 118—268)

The present invention relates to the lubrication and cleaning of magnetic tapes, flexible and plastic film including moving picture film and the like, during the use thereof either in recording or play-back, as in the case of the magnetic tape, or in exposure or projection as in the instance of flexible film useage. More specifically, the invention includes novel digital body element means having a self-contained reservoir for liquid silicones, positionable in the path of a moving tape or film whereby the film upon contact with said digital body element may be fully impregnated with the silicones lubricant and simultaneously buffed as in cleaning.

The prior art is replete with efforts to clean film and more recently Hausdorf has developed a system in which rotating rollers are used in conjunction with a kneading action surface putty material to cover the surface of film. Such devices however are complex and ill-adapted to disposition upon the recording instrument and/or a motion picture projector intermediate the feed and take-up reels thereof. Moreover, until the present concept of invention, the impregnation of film through the use of prepared silicones lubricant during normal operation of the device has not been made the subject of patent or otherwise commercially exploited. With these thoughts in mind we have devised simple and inexpensive means for thoroughly impregnating films and/or tapes with a specially prepared silicones lubricant, in which one element of the invention, namely a sleeve, devised to contact the tape or film, may be disposed of and replaced as required. Accordingly the following objects of invention are inherent in the construction which is hereinafter described.

It is an object of this invention to provide means for simultaneously cleaning and impregnating flexible film and/or magnetic tape and the like with silicones lubricant during normal useage of said film and/or tape.

A further object of this invention is to provide a removably positionable silicones applicator means for magnetic film, tape and the like in which the means contacting said film to apply silicones thereto may be readily replaced for cleaning and re-use.

Yet another object of invention is to provide novel means for securing a digital fluid silicones dispenser intermediate of reel feed and take-up portions of projectors, recorders and like film or tape motion devices.

A further objective of invention resides in providing a self-sustaining reservoir and dispenser of simple construction for inter-position on tape recording devices and the like whereby the means supplying silicones for impregnation of the tape may be continuously saturated with a silicones lubricant during useage of the device simultaneously as the tape may be used in recording, erasure or play-back.

In semi-fixed silicones lubricant and dispensers for magnetic tape and film and the like it is an objective of invention to devise a simple and unique construction in which novel silicones retaining reservoir means may be used in conjunction with an applicator element insuring relative saturation of said applicator element during passage of the film or tape in intimate contact therewith.

These and other objectives will be apparent from a study of the ensuing description and drawings in which.

Figures 1, 2:
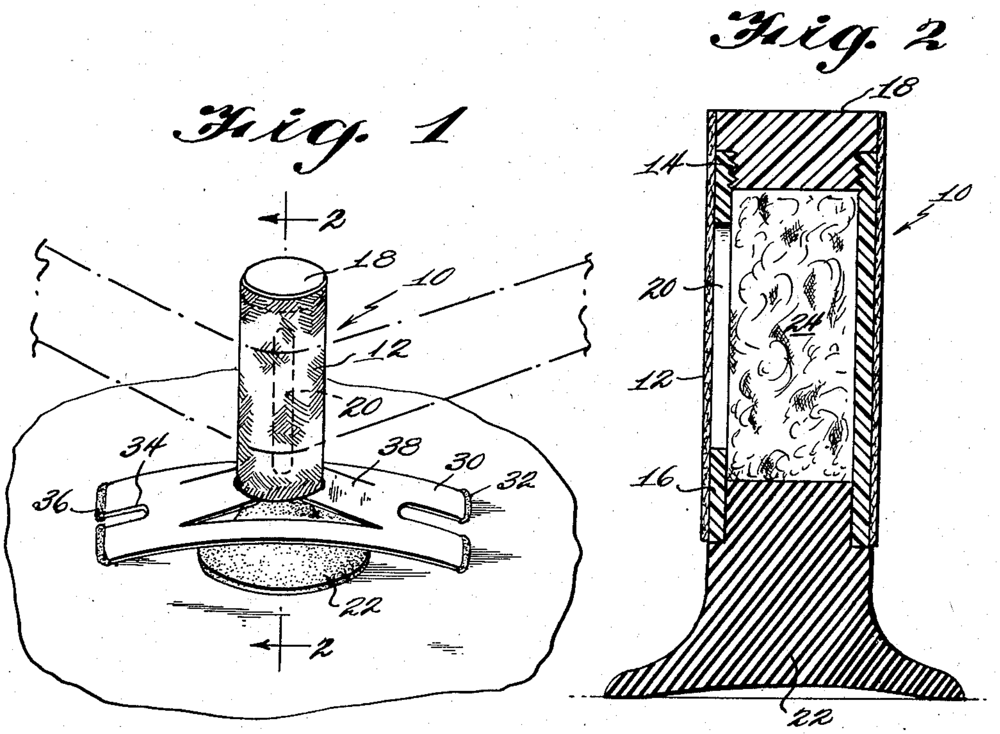
Figure 1 is a view in perspective of one form of invention including stabilizing means.
Figure 2 is a vertical sectional view of the invention depicted in Figure 1, less the stabilizer, said view being taken along the lines 2—2 of Figure 1.

Referring now to the drawings there is shown in Figure 1 a dispenser 10 including a tubular body element which may be formed of rigid plastic or other suitable material threaded at its top opening 14 and having an opposed open end 16 at the bottom thereof. See Figure 2 also. It is proposed that the top end of the tubular member be capped as 18 and that longitudinally of the tubular member there be provided at least one aperture 20 providing communication between interior of the tubular member and the sheath 12 described hereinafter.

At the lower end of the tubular body element a suction element 22 is incorporated, providing as well a stopper, the elements 18 and 22 respectively confining batting or other suitable material effective for retaining the desired blend of silicones as a reservoir for the sleeve 12.

The desired blend of lubricants include fluid dimethyl silicones having a viscosity of approximately 250 centistokes. It is this blend which is employed as the saturating element for the exterior sleeve as well as for the batting contents, providing the reservoir with a means for retaining the silicones in constant contact with film or tape for impregnation thereof. One of the more important features of the lubricant used in the present system resides in preparation of magnetic striping for use in recording or play-back all the while avoiding removing oxide of iron therefrom. Additionally, it is desired that the silicones lubricant provides a lubricant-protective surface between a magnetic striping or tape and the magnetic head of a recording device precluding the necessity for cleaning the magnetic head of recording devices with carbon tetrachloride and other somewhat harmful cleaning agents such as leave carbon and related harmful deposits. It is moreover equally important in treating magnetic striping and or motion picture film that the lubricant remain in situ irrespective of evaporating influences such as temperature change and exposure. The foregoing blend of fluid silicones is suitable for the purpose at hand, meeting essentially all of the requirements set forth.

Accordingly, both the filler batting 24 and sleeve 12 are thoroughly saturated with prepared silicones blend by compression and release in the presence of a bath of fluid blend, the latter being removable for reconditioning at any time. With respect to the sleeve, it is preferred that the sheath be woven and have a buffer surface suitable for simultaneously cleaning the striping and or film as it is lubricated.

In Figure 1 a stabilizing outrig or anchor 30 is releasably secured to the upright tubular element through opposed gripping segments 38, the extensions of the outrig being designed to forcibly rest against the surface of a recording machine and the like and to stabilize the upright tubular member as shown. A latex compound 36 is applied to the ends to prevent scratching and suitable aperatures 32 and 34 respectively are likewise defined should the surface of the instrument bearing the striping or film be unsuitable for use of the suction element per se. In this event, bolt or screw means on the recording or other device may serve as anchor to the stabilizer.

Figure 3:
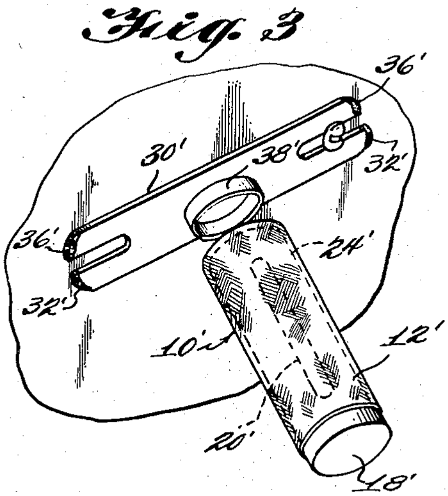
Figure 3 is a view in perspective of a modification of the invention showing novel attachment means.
Figure 4:
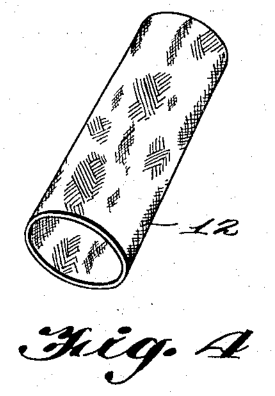
Figure 4 is a view in perspective of a sleeve element removed from the constructions shown in Figures 1, 2 and 3 inclusive.

Referring to Figure 3 it will be noted that suitable anchor means may be provided in the form shown as at 30' the slotted apertures 32' at either end being designed for engagement with existing projection or recording instrument construction elements. Obviously this construction including cylindrical projection 38' could be made integral with the tubular body element 10' and of similar material. In the construction shown, the central tubular projection engages a corresponding end portion of the tubular body element 10' and may be sealed thereagainst through the use of a suitable resin glue or if the respective elements are yet metallic, a metallic weld or crimping would suffice. Similarly element 22 shown in Figures 1 and 2 is secured to the bottom portion of the tubular elements 10. It is obvious that one arm only of element 30' would be required in some instances where close quarters are met. The sleeve shown in Figure 4 comprises a seamless tube of woven or braided and pre-impregnated cloth such as broadcloth and the like. The weave however is not sufficiently tight to prevent thorough saturation of the sleeve with the silicones lubricant as blended, nor is the warp and weft so tight that it shall not retain the silicones for impregnation of the striping or film sufficiently to lodge within the spaces or interstices between iron oxide particles and binder in magnetic striping or between binder and metal oxide in sound track of movie film. The sleeve contains 70 percent pella oil and 30 percent dimethyl silicones by weight.

From the foregoing it will be appreciated that the basic construction shown in Figure 2 may be used with or without the rigid rib stabilizer anchor element 30 shown in Figure 1. Additionally, the construction of Figure 3 has sufficient rigidity to insure faithful operation of the magnetic striping and/or motion picture film, dependent upon careful location of the device upon the recording instrument or projection instrument as the case may be. For effective operation it is desired to construct or have constructed such a device that the longitudinal aperture thereof will have greater length than the width of magnetic striping and/or film. The aperture is set to lie adjacent the striping whereby a well defined and continuously saturated area of the sleeve is exposed. Further, in operation the sleeve being of greater length than the width of film or tape shall twist upon the tubular body element 10 slightly, forcing itself thereby into immobility with respect to a moving film or strip during its use. It will be noted that the construction and pinking waste of woven cloth 24 is such as to permit creeping of the silicones from the reservoir outward of the aperture 20 onto sleeve 12, continuously during operation of a machine upon which the device is deposited, semi-fixed.

For refill of the reservoir we have selected a lubricant consisting of 30 percent dimethyl silicones and 70 percent pella oil each of 50 centistokes viscosity to yield uniform lubrication to the striping or film by way of wicking as applied to the sleeve, pre-impregnated with a 250 centistokes di-methyl silicones blend.

From the foregoing it will be obvious that various modifications to the construction shown could be made without departing from the spirit of the claims appended hereto. Accordingly, we wish to be restricted only as the invention may be defined in the claims of record.

We claim:

1. A lubricant dispenser for lubricating moving tapes, strips and the like comprising a rigid lubricant dispensing body element removably positionable upon reel feed and take-up units for intimate and buffing contact with moving tape, anchor means at one end of said body element, said anchor means being engageable with a reel feed and take-up unit, said body element comprising a fixed substantially tubular member defining a lubricant reservoir and having at least one segment thereof open to its exterior, a permeable tape-engaging sleeve disposed about said body element, said reservoir of said body element lubricating the sleeve adjacent the open segment of the reservoir, the tape-engaging segment of said sleeve being communicant with the reservoir to maintain an area of sleeve saturation in intimate and buffing contact with said moving tape.

2. A lubricant dispenser for lubricating moving tapes, strips and the like comprising a rigid lubricant dispensing body element removably positionable upon reel feed and take-up units for intimate and buffing contact with moving tape, anchor means at one end of said body element, said anchor means being engageable with the reel feed and take-up unit, said body element comprising a substantially tubular member defining a lubricant reservoir and having at least one segment thereof open to its exterior, a permeable tape-engaging sleeve disposed about said body element, said sleeve comprising a disposable open-ended, substantially seamless tubular member fitting concentrically against said body element in substantial coextension thereof, said reservoir of said body element lubricating the sleeve adjacent the open segment of the reservoir, the tape-engaging segment of said sleeve being communicant with the reservoir to maintain an area of sleeve saturation in intimate and buffing contact with said moving tape.

3. The device according to claim 1 in which the dispenser includes a chamber communicant with a tape-engaging segment of the sleeve, said chamber having silicones saturated batting confined therein, retaining the silicones reservoir in continuous contact with said tape-engaging segment of the sleeve whereby its relative saturation is maintained during continuous passage of tape against said sleeve as aforesaid.

4. The device according to claim 2 in which the dispenser includes a chamber communicant with a tape-engaging segment of the sleeve, said chamber having silicones saturated batting confined therein, retaining the silicones reservoir in continuous contact with said tape-engaging segment of the sleeve whereby its relative saturation is maintained during continuous passage of tape against said sleeve as aforesaid.

References Cited in the file of this patent

UNITED STATES PATENTS

| | | |
|---|---|---|
| 1,276,263 | Phelan et al. | Aug. 20, 1918 |
| 2,242,400 | Loane et al. | May 20, 1941 |
| 2,286,473 | Duggan | June 16, 1942 |
| 2,383,842 | Duggan | Nov. 28, 1944 |
| 2,426,838 | Miller | Sept. 2, 1947 |
| 2,469,890 | Patnode | May 10, 1949 |
| 2,471,850 | Wilcock | May 31, 1949 |
| 2,656,420 | Isberg | Oct. 20, 1953 |
| 2,672,122 | Kupec et al. | Mar. 16, 1954 |
| 2,760,464 | Roggenburger | Aug. 28, 1956 |